(12) United States Patent
Green et al.

(10) Patent No.: US 6,516,634 B1
(45) Date of Patent: Feb. 11, 2003

(54) STRENGTHENING, CRACK ARREST AND MULTIPLE CRACKING IN BRITTLE MATERIALS USING RESIDUAL STRESSES

(75) Inventors: David J. Green, State College, PA (US); Vincenzo M. Sglavo, Roncegno (IT); Rajan Tandon, Fremont, CA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/502,284

(22) Filed: Feb. 11, 2000

Related U.S. Application Data
(60) Provisional application No. 60/119,986, filed on Feb. 12, 1999.

(51) Int. Cl.[7] .............................................. C03C 15/00
(52) U.S. Cl. ......................... 65/30.14; 65/30.13; 65/28; 65/114
(58) Field of Search ............................ 65/30.13, 30.14, 65/28, 114

(56) References Cited

U.S. PATENT DOCUMENTS

| | | | |
|---|---|---|---|
| 3,287,201 A | * 11/1966 | Chisholm et al. | .......... 65/30.14 |
| 3,410,673 A | 11/1968 | Marusak | |
| 3,433,611 A | * 3/1969 | Saunders et al. | .......... 65/30.14 |
| 3,533,888 A | 10/1970 | Eppler et al. | |
| 3,630,704 A | 12/1971 | Garfinkel et al. | .............. 65/30 |
| 3,773,488 A | 11/1973 | Tran et al. | ...................... 65/30 |
| 3,798,013 A | 3/1974 | Inoue et al. | ..................... 65/30 |
| 4,846,868 A | 7/1989 | Aratani | ...................... 65/30.14 |
| 4,872,896 A | 10/1989 | LaCourse et al. | .......... 65/30.14 |
| 5,804,317 A | * 9/1998 | Charrue | ...................... 428/410 |

FOREIGN PATENT DOCUMENTS

| | | | |
|---|---|---|---|
| BE | 738528 | * 3/1970 | ................ 65/30.14 |

OTHER PUBLICATIONS

PCT International Search Report for application PCT/US00/03590 dated May 25, 2000.
Tandon et al., "Residual Stress Determination Using Strain Gage Measurements," *J. Am. Ceram. Soc.* 73[9] 2628–2633 (1990).
Tandon et al., "Crack Stability and T–Curves Due to Macroscopic Residual Compressive Stress Profiles," *J. Am. Ceram. Soc.* 74[8] 1981–1986 (1991).
Tandon et al., "The effect of crack growth stability induced by residual compressive stresses on strength variability," *J. Mater. Res.* vol. 7, No. 3, 765–771, (Mar. 1992).
Green et al., "Crack Arrest and Multiple Cracking in Glass Through the Use of Designed Residual Stress Profiles," *Science*, vol. 283, 1295–1297, (Feb. 26, 1999).
Heywood, "Engineered Glass: Strong, Reliable, and User Friendly," *Penn State MATSE*, 5–6 (Jun. 99).

(List continued on next page.)

*Primary Examiner*—Michael Colaianni
(74) *Attorney, Agent, or Firm*—Konrad Raynes Victor & Mann, LLP; Alan S. Raynes (57) ABSTRACT

Embodiments include a method for forming a glass which displays visible cracking prior to failure when subjected to predetermined stress level that is greater than a predetermined minimum stress level and less than a failure stress level. The method includes determining a critical flaw size in the glass and introducing a residual stress profile to the glass so that a plurality of visible cracks are formed prior to failure when the glass is subjected to a stress that is greater than the minimum stress level and lower than the critical stress. One method for forming the residual stress profile includes performing a first ion exchange so that a first plurality of ions of a first element in the glass are exchanged with a second plurality of ions of a second element that have a larger volume than the first ions. A second ion exchange is also performed so that a plurality of the second ions in the glass are exchanged back to ions of the first element.

15 Claims, 4 Drawing Sheets

OTHER PUBLICATIONS

Green, "Compressive Surface Stresses in Glass: An Old Curiosity?" *Z. Metallkd.* 90 (1999) 12 at pp. 1059–1063.

Tandon et al., "Strength Variabiilty in Brittle Materials With Stabilizing and Destabilizing Resistance Fields," *Acta metall. mater.* vol. 41, No. 2, pp. 499–408 (1993).

Virkar, "Determination of Residual Stress Profile Using a Strain Gage Technique," *J. Am. Ceram. Soc.* 73[7] 2100–2102 (1990).

Tandon et al., "Crack Stability ion Residually–Stressed Surfaces," in The Physics of Non–Crystalline Solids, eds. L.D. Pye, W.C. LaCourse and H.J. Stevens, at pp. 659–663, Taylor & Francis, London, (1992).

Declaration of David J. Green, including Exhibits A and B, dated Nov. 10, 2000.

Callister, William; "Material Science and Engineering: An Introduction" pp. 196–204, copyright 1991.*

* cited by examiner

STRENGTHENING, CRACK ARREST AND MULTIPLE CRACKING IN BRITTLE MATERIALS USING RESIDUAL STRESSES

This application claims the benefit of U.S. Provisional Application No. 60/119,986, filed Feb. 12, 1999, entitled "Strengthening and Crack Arrest in Brittle Materials Using Residual Stresses," which is hereby incorporated by reference in its entirety.

TECHNICAL FIELD

The present invention relates to methods for introducing crack arrest behavior into a brittle material by designing particular types of residual stress profiles in the material.

BACKGROUND

Brittle materials, such as ceramics and inorganic glasses, are sensitive to surface contact damage, which gives rise to flaws that reduce strength and leads to a large variation in strength from specimen to specimen. These materials usually fail in an unstable and catastrophic manner, with no advanced warning, when subjected to sufficiently high mechanical and/or thermal stresses. When such materials are tested in bending, uniaxial tension, or other types of tensile stress fields, a single flaw typically forms into a propagating crack that grows rapidly and in an unstable manner. Extensive damage may also occur in a thermal shock (rapid change in temperature) type of loading and lead to multiple cracks. When failure occurs, there is no forewarning and the material may splinter and cause harm. It would therefore be useful to be able to find ways to reliably arrest cracks in such brittle materials.

One approach for improving the mechanical reliability of brittle materials is to increase their strength. Surface compression is known in the art to improve the surface contact damage resistance and strength of many brittle materials, due to the increased energy required to propagate a crack through the region of compression. Silicate glasses may be thermally tempered or chemically strengthened as known in the art to introduce such compressive stresses into the surface.

A typical thermal tempering process may include heating the object to a temperature in which internal stresses can be relaxed without deformation. The object is then quickly cooled. The significantly different cooling rates for the surface versus the center regions of the object lead to a residual stress at the surface.

Typical chemical strengthening processes may introduce surface compression by two methods. In one method, the surface region is chemically modified such that it has a lower thermal expansion coefficient than the underlying material so that during cooling, it is placed in residual stress. In another method, a chemical reaction can be used to increase the volume of the surface region by processes such as ion exchange, phase transformations and oxidation. Provided that this process can be carried out without any major stress relaxation, the increased volume of the surface region of the object will give rise to residual compression. Another method for introducing compressive stresses into an object is to apply a coating having a lower coefficient of thermal expansion than the material being coated. When applied at an elevated temperature, upon cooling, the surface will be placed into residual compression. One benefit of forming surface compression is that it often leads to a minimum strength value. However, a limitation is that failure of the material will still be catastrophic under sufficient loading conditions.

In addition, introduction of a surface compression may lead to an increase in the strength variability. In one study on the ion exchange strengthening of silicate glass, the coefficient of variation in the strength increased by almost a factor of 2 for a sixfold strength increase. Increased strength variability leads to difficulties in the design process, and is an obstacle to the engineering use of these materials. For brittle materials, design engineers often need to assure the mechanical reliability in terms of very small failure probabilities at a prescribed design stress level for a given lifetime. It would be desirable to identify processes that can be used to increase strength and decrease strength variability.

SUMMARY

One preferred embodiment relates to a method including determining a largest flaw size in a material and introducing compressive residual stress into said material in a manner so that the absolute value of said compressive stress increases from a first value to a second value within a depth in the material. The first value of residual stress is controlled to be less compressive than the second value, and the depth of the residual stress is greater than the largest flaw size. In addition, the first value of residual stress is selected to provide a stress gradient that results in multiple cracking of the material without failure of the material when subjected to a sufficient applied stress.

Another embodiment relates to a method for forming a glass which displays visible cracking prior to failure when subjected to an applied stress level that is greater than a predetermined minimum stress level and less than an ultimate stress level for failure. The method includes determining a critical flaw size in the glass and introducing a residual stress profile to the glass so that a plurality of visible cracks are formed prior to failure in the glass when the glass is subjected to a stress that is greater than the minimum stress level and lower than the ultimate stress level, by calculating an apparent fracture toughness curve from the residual stress profile and selecting the applied stress level to be in a region of inflection along the apparent fracture toughness curve.

Still another embodiment relates to a method for introducing residual stress into a material including performing a first ion exchange to a first depth to exchange a plurality of first ions with a plurality of second ions having a larger volume than the first ions.

The method also includes performing a second ion exchange to a second depth to exchange a plurality of second ions with a plurality of third ions having a smaller volume than the second ions. The first depth is controlled to be greater than the second depth.

BRIEF DESCRIPTION OF THE DRAWINGS

Certain embodiments of the invention are described with reference to the accompanying figures which, for illustrative purposes, are not necessarily drawn to scale.

DETAILED DESCRIPTION

Certain embodiments of the present invention relate to methods for arresting cracks in brittle materials using residual stresses. Preferred methods involve designing a specific residual stress profile such that defects or cracks will encounter an increase in fracture resistance as they propagate that exceeds the amount of energy available for growth. This approach allows brittle materials to strengthened with small strength variability with the presence of multiple cracking prior to the final failure. As examples, these qualities have been demonstrated for silicate glasses using an ion-exchange procedure.

Figure 1:
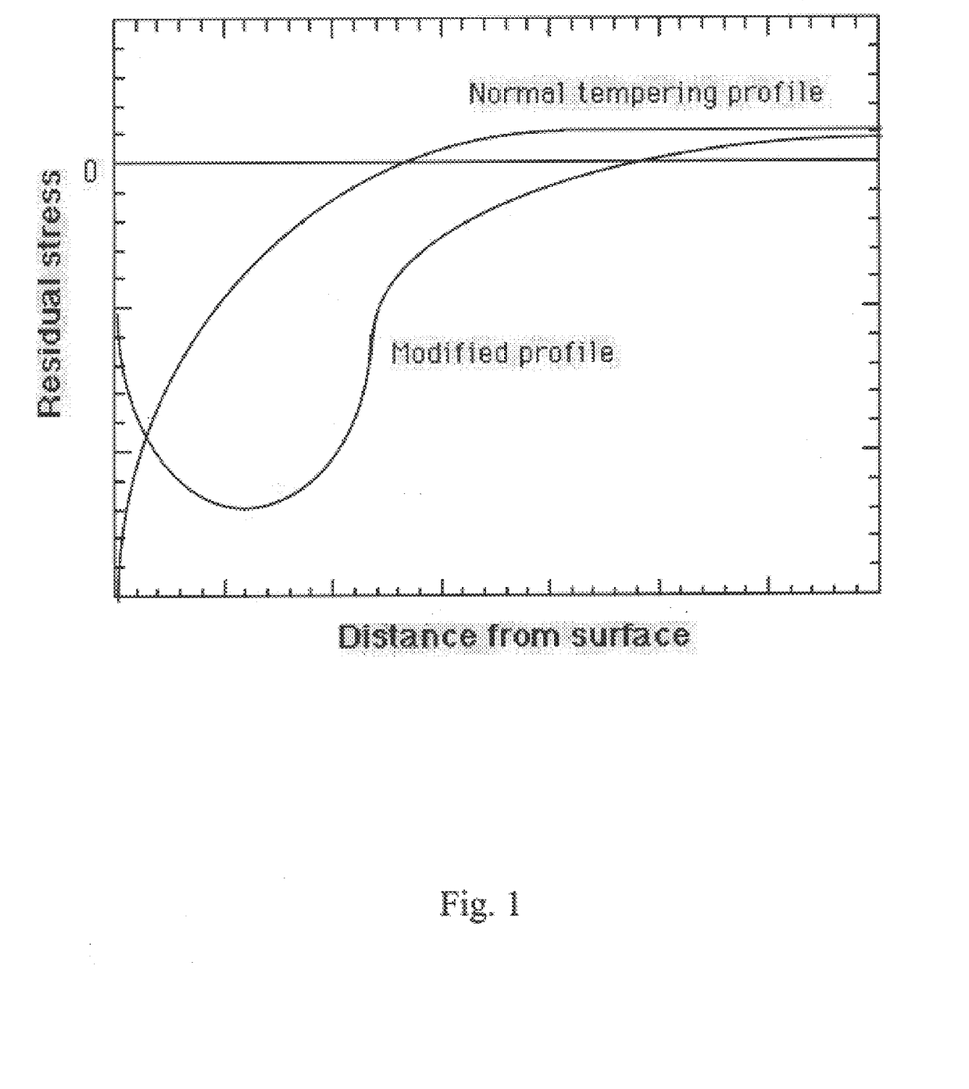
FIG. 1 illustrates residual stress profiles produced by the tempering of glass according to a conventional thermal tempering or chemical strengthening profile and a modified profile according to an embodiment of the present invention.

It has been proposed theoretically that some compressive residual stress profiles will increase the difficulty of crack propagation and that the cracks will be arrested by these stresses. This strengthening process can be designed in such a way that there is a reduction in strength variability. In FIG. 1, two schematic residual stress profiles produced by tempering of glass are compared. In the conventional or normal situation, it has been desired to obtain the highest residual compression at the surface (lowest negative stress). That is, processing conditions have been designed so that minimum relaxation or reduction of stress occurs at the surface. This approach assumes that the maximum compression will give the most strengthening and maximum resistance to contact damage. Unfortunately, surface defects have a variety of sizes so that although strength is increased, it is often more dispersed after tempering.

One preferred embodiment provides a residual stress profile like the alternative or modified profile shown in FIG. 1. By increasing the amount of compression initially, this will act like an increase in toughness making it more difficult for a crack to propagate as it increases in size. In particular, this profile was designed so cracks will grow in a stable (non-catastrophic) fashion for certain stress gradients. With such a profile, cracks will grow to a specific size before the final failure and this final event would occur at approximately the same stress value (and crack length), i.e., there will be very little strength variability.

Preferred embodiments include methods by which this process can be accomplished. Embodiments were applied to silicate glasses, which are useful engineering materials as well as being prototypical brittle solids. The results demonstrated that once the first (most severe) crack propagated, it would arrest and then other cracks would be formed, a process called multiple cracking. Preferred embodiments may be applied to any process that is used to introduce surface compression into materials.

EXAMPLE I

In the first example, chemical strengthening using ion exchange was used to introduce a residual stress into a sodium aluminosilicate glass by exchanging sodium ions with potassium, using conventional ion exchange procedures. In this example, however, some of the 'exchanged' potassium near the surface was exchanged back to sodium in a second ion exchange step to produce a composition profile that would produce the crack arrest phenomenon. Diffusion theory as known in the art can be used to estimate the ion exchange times and temperatures necessary to obtain a selected stress or composition profile.

Figure 3:
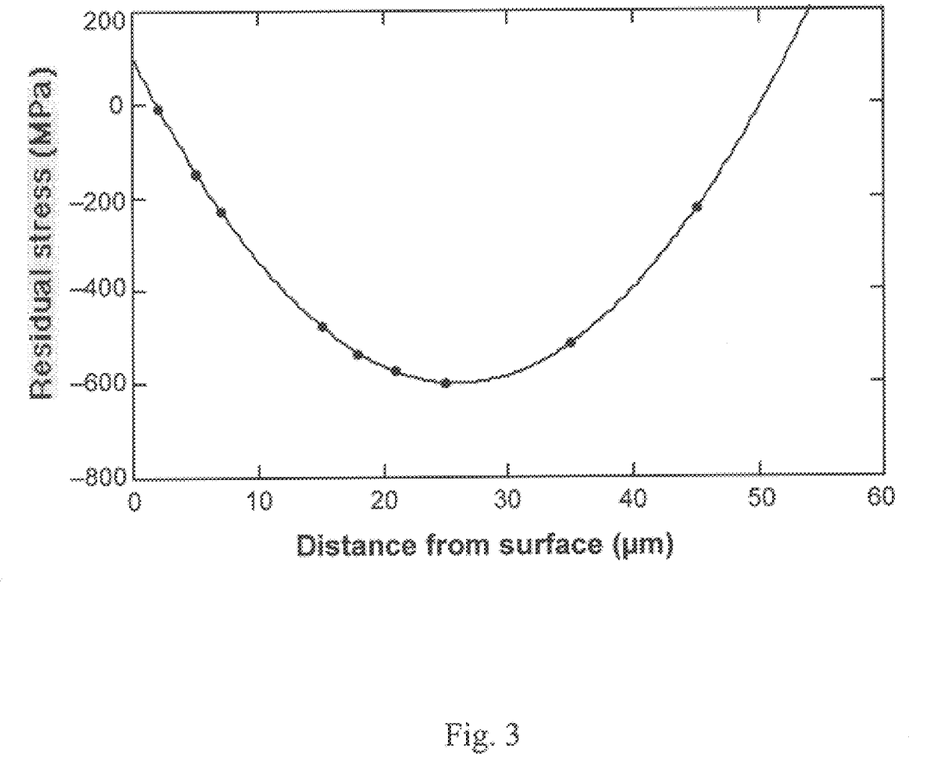
FIG. 3 illustrates a residual stress profile obtained for a glass specimen processed using an ion exchange process in accordance with an embodiment of the present invention.

The depth of the maximum potassium concentration is generally at approximately the same depth below the external surface as the lowest stress (compression maximum). This depth should be selected to exceed the largest surface flaw size. It is desirable to identify the gradient in the potassium concentration that will produce crack arrest and multiple cracking. There are several preferred ways to accomplish this goal. The first is to vary the conditions (salt bath concentration, time and temperature) for the second exchange and observe the failure behavior. An alternative approach is to transform a selected concentration profile into a stress profile and then use the analysis of Tandon and Green (from J. Am. Ceram. Soc., 74[8] (1991) 1981–86) to determine the change in the apparent fracture resistance (toughness) that results from the residual compression. This equation can be stated as $$K_S = \frac{M}{\sqrt{\pi c}} \int_0^c \sigma_R(x) g(x) dx$$

where x is the distance from the surface, g(x) is the Green's function which depends on the particular crack configuration, $\sigma_R(x)$, is the residual stress profile, c is flaw size and M is a surface correction factor. Applicants' hereby incorporate by reference in its entirety the article from J. Am. Ceram. Soc., 74[8] (1991) 1981–86). Using the above equation, it is then possible to determine residual stress profiles that will give the inflection in the apparent fracture resistance (or toughness) that indicates stable crack growth and multiple cracking. In addition, the maximum in the fracture resistance was designed such that it occurred at a depth that is larger than that of any surface flaw, so that the flaws would be 'trapped' at this depth by the increase in fracture resistance. For example, in uniaxial tension the region of stability can be found by drawing a straight line from the origin so it forms a tangent with the apparent toughness curve. Such a straight line is illustrated in FIG. 3. The crack sizes that lie between the intersection of the toughness curve and the point of tangency will be subjected to some degree of stable growth and multiple cracking.

The sodium aluminosilicate glass composition (available as Corning Code 0317, from Corning Inc., Corning, N.Y.) included (wt %) about $62.3SiO_2$, $12.8Na_2O$, $0.27CaO$, $3.26MgO$, $3.47K_2O$, $16.4Al_2O_3$, $0.75TiO_2$, $0.24Fe_2O_3$, and $0.04SnzO_2$. The original sheets of glass were cut into rectangular bars with nominal size 2×5×60 mm. The edges of the samples were chamfered to SiC paper and polished with 3 μm diamond paste. The procedure was adopted to remove any flaws generated during the cutting process. The glass bars were annealed for 8 hours in air at 560° C. to remove residual stresses associated with the machining. Heating and cooling rates of 600° C. per hour and 180° C. per hour were used. The ion exchange process was carried out using a semiautomatic furnace (LEMA TC 20 A, Parma, Italy), in which specimens were suspended by a stainless steel frame in a 5 liter liquid salt bath. The furnace was equipped with devices that maintain the steel frame just above the liquid bath salt for about 5 minutes prior to immersing the frame into the bath. At the end of the ion exchange process, the frame was pulled up and kept above the liquid bath for 25 minutes. Then, the steel frame was removed from the furnace. At the end of each ion exchange cycle, the specimens were cleaned with deionized water.

The glass was initially immersed in molten potassium nitrate ($KNO_3$) at 500° C. for 120 hours. The second exchange was performed in a molten salt mixture (30 mol % $NaNO_3$+70 mol % $KNO_3$) at 400° C. for 25 minutes. For the initial set of experiments, twenty specimens of this glass were broken using four-point bending. Inner and outer spans of 20 mm and 40 mm were used. The tests were performed in water at a stressing rate of 80 MPas. The average strength was found to be 330 MPa and the scatter in strength was very small. Average strengths of such a glass without the ion exchange would normally be less than 200 MPa and typically would possess a standard deviation as high as 40 MPa. These values also indicate the glass is strengthened by the ion exchange process. The complete range of strength values for the tests was from 318 to 341 MPa. For the specially designed double exchanged glass, the coefficient of variation in strength was less than 2%. It was also found the glass underwent multiple cracking. That is, a crack would form on the tensile surface of our test specimens but would arrest. This behavior shows that the compressive peak in the residual stress acts as a significant obstacle to crack propagation such that flaws of various sizes are activated but form into cracks that arrest. This was followed by the formation of other cracks, indicating that the material exhibited some 'fail-safe' behavior even though it was a brittle material. Such behavior is extremely unusual and could be exploited in many technological applications where ceramics and glasses are used so that the materials can be used in a more reliable way. For example, the presence of such multiple cracks can be a signal that the part has undergone some significant stress and that additional stress may lead to catastrophic failure. Then, a part showing a plurality of such cracks can be replaced prior to catastrophic failure.

Figure 2:
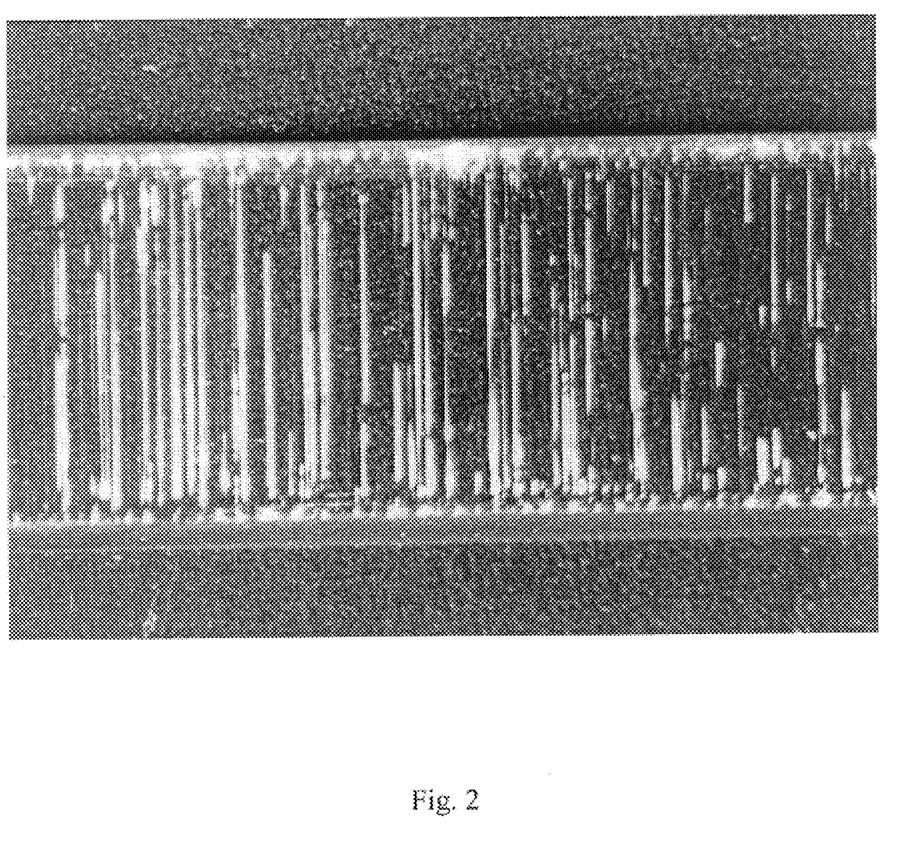
FIG. 2 is a photograph illustrating multiple cracks formed on a glass specimen formed in accordance with an embodiment of the present invention.

FIG. 2 shows a photograph of the multiple cracks on the tensile surface of the glass as observed on an optical microscope. The specimen width (vertical dimension) in the photograph is 5 mm. The multiple cracking process is somewhat analogous to the crazing observed in some polymeric materials. Typical of high-strength ion-exchanged glasses, the final failure was still of an explosive nature involving fine fragmentation. This feature is desirable in engineering systems as it minimizes dangers from splinters.

EXAMPLE II

Figure 4:
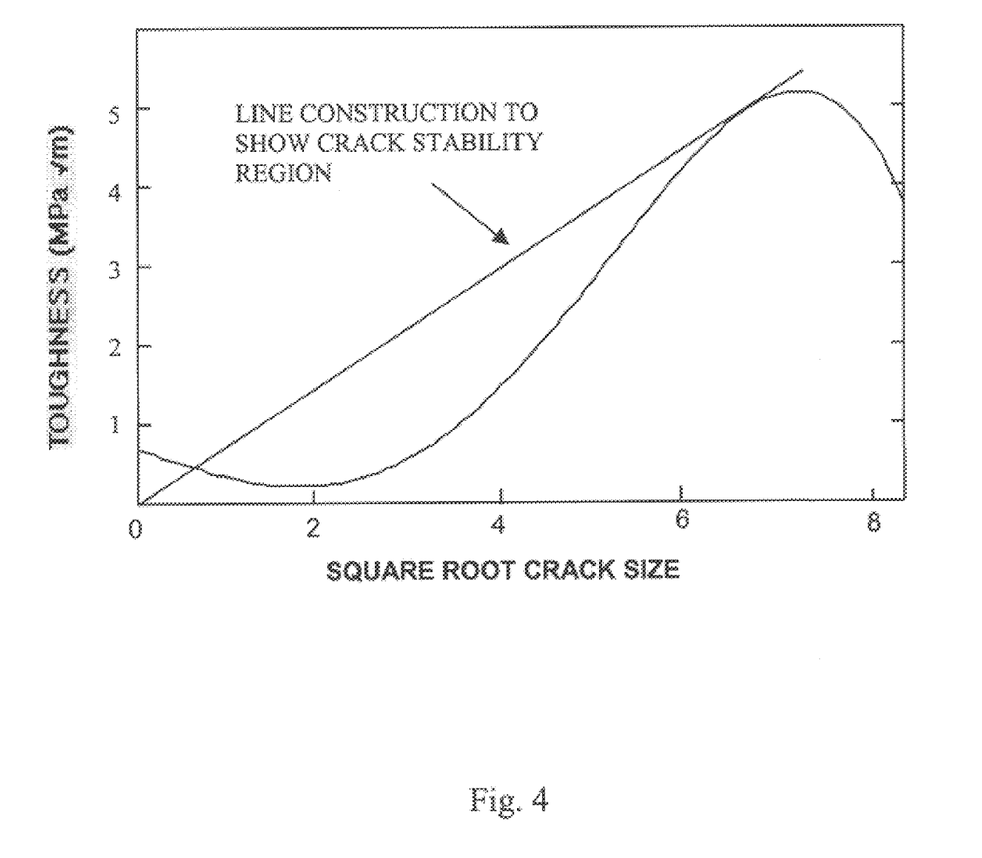
FIG. 4 is an apparent toughness curve derived from the residual stress information of FIG. 3.

In the second example, chemical tempering using ion exchange for the same glass as example I was used to introduce the residual stress but different processing conditions were used. The first ion exchange was performed in molten $KNO_3$ for 24 hours at 500° C. followed by a second (reverse) ion exchange in 30 mol % $NaNO_3$/70 mol % $KNO_3$ for 0.5 hours at 400° C. FIG. 3 shows the residual stress profile obtained by the ion exchange process. The stress profile was measured using a known surface removal technique utilizing a curvature measurement. As can be seen, the stress fell to a minimum value (maximum compression) of −600 MPa at a distance from the surface of about 27 gm. As indicated earlier, the stress profile can be transformed into an apparent toughness curve and this is shown in FIG. 4. The toughness curve possesses the necessary slope changes (inflection) to produce stable growth for crack sizes in the range of 0.5 to 20 $\mu$m.

To test the effect of the processing on mechanical reliability, 14 specimens of the above glass were fractured using four point bending. The average strength was found to be 579 MPa with strengths ranging from 545 to 599 MPa and a standard deviation of 14 MPa. These values indicate, therefore, that the glass is being strengthened by the ion exchange process, and the coefficient of variation is decreased from approximately 20% for non-tempered glasses to 2.4% for the specially designed glass according to the second embodiment. The strength variability in brittle materials is often described by the Weibull modulus as known in the art. The Weibull modulus is a stress exponent that describes the relation between a failure probability function and the applied stress. The higher the strength variability, the lower is the value of the Weibull modulus. For non-tempered silicate glasses, a Weibull modulus of 5 to 10 is fairly normal but for the glass according to the second example, the Weibull modulus exceeded 40. This glass also showed multiple cracking on the tensile surface of the bend bars and final failure occurred by fragmentation.

EXAMPLE III

In this example, processing conditions that produced multiple cracking in a different silicate glass were identified. The glass used was a soda lime silica composition. This family of glasses is often termed window glass for its use in many commercial applications, such as glazing and containers. The composition (wt %) of the particular soda lime silica glass was about 71% $SiO_2$, 13% $Na_2O$, 10% CaO, 4% MgO, 1% $Al_2O_3$, and about 1% others. Various processing conditions were identified that led to multiple cracking. The first exchange was performed at 450° C. for times ($=t_1$) of 48 hours and greater. The second exchange was performed for temperature ($T_2$) ranging from 350 to 450° C. for 30 minutes. The multiple cracking was observed provided for $KNO_3$ $NaNO_3$ weight ratios ($=r$) greater than two. For two of the experimental conditions ($t_1=96$ h, $r=4$, $T_2=400°$ C.) and ($t_1=48$ h, $r=2$, $T_2=400°$ C.), the four-point bend strength was determined to be 378±42 MPa and 401±37 MPa, respectively. The strength of the glass without the ion exchange was 123±17 MPa, thus confirming the strengthening process and a reduction in the coefficient of variation in strength.

Certain preferred embodiments provide an approach in which a residual stress or composition profile can be designed such that it allows a crack in a material to be arrested or to grow in a stable fashion. Cracks in the body will encounter an increase in the amount of residual compression, i.e., the stress becomes more negative as the crack propagates. For preferred processes the stress should decrease at a critical rate with distance to be effective. If correctly designed, preferred processes increase strength and decrease strength variability when compared to an unmodified material. Such techniques can be applied to any material system in which residual stresses can be introduced. Some methods that may be used to introduce residual surface stresses include ion exchange, chemical tempering, thermal tempering, ion bombardment, surface phase transformations, chemical reactions, composition gradients, hybrid lamination (which includes introducing compressive layers into layered structures by controlling the composition of the layers) and functionally-graded or layered coatings.

It is also possible to design a stress gradient such that the visible cracks will show up in the material at a predetermined stress in order to alert the user that the material is reaching a stress that is near to the recommended stress limit of the material. Such an early warning material makes it possible to observe the amount of stress a brittle material has been subjected to and replace the part prior to catastrophic failure. Such a gradient may in certain embodiments be formed using two or even more than two ion exchanges for more precise control of the stress gradient.

What is claimed:

1. A method comprising:

determining a largest flaw size in a material; and introducing compressive residual stress into said material in a manner so that the absolute value of said compressive residual stress increases from a first value to a second value within a depth in said material, said first value being smaller than said second value, said depth being greater than said largest flaw size, said first value selected to provide a stress gradient that results in multiple cracking of said material without failure of said material when subjected to a sufficient applied stress.

2. A method as in claim 1, wherein said introducing residual stress into said material comprises performing ion exchange.

3. A method as in claim 2, wherein said ion exchange comprises a first exchange of ions of a first type and a second exchange of ions of a second type.

4. A method as in claim 1, wherein said introducing residual stress comprises a process selected from the group consisting of thermal tempering, ion exchange, ion bombardment, surface phase transformations, chemical reactions, composition gradients, hybrid lamination and functionally-graded or layered coatings.

5. A method as in claim 1, wherein said introducing residual stress comprises a chemical strengthening process.

6. A method as in claim 5, wherein said material includes a thermal expansion coefficient that is modified in order to introduce said residual stress.

7. A method for forming a glass which displays visible cracking prior to failure when subjected to an applied stress level that is greater than a predetermined minimum stress level and less than an ultimate stress level for failure, said method comprising:

determining a critical flaw size in said glass; and introducing a residual stress profile to said glass so that a plurality of visible cracks are formed prior to failure in said glass when said glass is subjected to a stress that is greater than said minimum stress level and lower than said ultimate stress level, by calculating an apparent fracture toughness curve from said residual stress profile and selecting said applied stress level to be in a region of inflection along said apparent fracture toughness curve.

8. A method as in claim 7, wherein said introducing a residual stress profile comprises:

performing a first ion exchange wherein a first plurality of ions comprising a first element are exchanged with a second plurality of ions comprising a second element and having a larger volume than said first ions; and performing a second ion exchange wherein a plurality of said second ions are exchanged to a plurality of third ions comprising said first element.

9. A method for processing a material, comprising:

determining an apparent fracture toughness of the material over a range of crack sizes;

wherein a change in the apparent fracture toughness with a change in the crack size is greater than a change in a stress intensity factor of the crack with the change in crack size; and introducing a compressive residual stress into the material based on the apparent fracture toughness over the range of crack sizes;

wherein the absolute value of the compressive residual stress increases from a first value at a surface of the material to a second value within a depth in the material, the first value being smaller than the second value; and wherein the material will display multiple cracking and crack arrest without failure of the material when subjected to an applied stress that is less than an ultimate tensile strength of the material.

10. A method for introducing residual stress into a sodium silicate glass, comprising:

performing a first ion exchange exchanging potassium ions for sodium ions to a first depth;

performing a second ion exchange exchanging sodium ions for potassium ions to a second depth;

wherein said first depth is greater than said second depth; and wherein the second ion exchange is carried out in a salt melt including a potassium to sodium molar ratio of greater than 1.

11. A method for introducing residual stress as in claim 10, wherein the second ion exchange is carried out in a salt melt including a potassium to sodium molar ratio of greater than 2.

12. A method for introducing residual stress as in claim 10, wherein the first ion exchange and the second ion exchange are each carried out in a salt melt including a potassium to sodium molar ratio of greater than 2.

13. A method for introducing residual stress as in claim 12, wherein the first ion exchange is carried out in a salt melt including a potassium to sodium molar ratio that is greater than that used in the second ion exchange.

14. A method for introducing residual stress as in claim 10, wherein the second ion exchange is carried out in a salt melt including a $KNO_3$ to $NaNO_3$ molar ratio of at least 2.

15. A method for introducing residual stress as in claim 10, wherein the first ion exchange is carried out in a salt melt including a $KNO_3$ to $NaNO_3$ molar ratio that is greater than that used for the second ion exchange.

* * * * *

UNITED STATES PATENT AND TRADEMARK OFFICE
CERTIFICATE OF CORRECTION

PATENT NO.    : 6,516,634 B1  
DATED         : February 11, 2003  
INVENTOR(S)   : Green et al.

It is certified that error appears in the above-identified patent and that said Letters Patent is hereby corrected as shown below:

Column 1,
Line 9, after "entirety." please add the following:
-- This invention was made with support from the U.S. Government under DOE Grant No. DE-FG02-86ER45252. The U.S. Government has certain rights in the invention. --

Signed and Sealed this

Sixteenth Day of December, 2003

JAMES E. ROGAN
*Director of the United States Patent and Trademark Office*